US007082471B2

(12) United States Patent
Hericourt

(10) Patent No.: US 7,082,471 B2
(45) Date of Patent: Jul. 25, 2006

(54) METHOD AND SYSTEM OF DISPATCHING SOCKS TRAFFIC USING TYPE OF SERVICE (TOS) FIELD OF IP DATAGRAMS

(75) Inventor: Olivier Hericourt, Cagnes-sur-Mer (FR)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 09/755,444

(22) Filed: Jan. 5, 2001

(65) Prior Publication Data

US 2001/0023451 A1    Sep. 20, 2001

(30) Foreign Application Priority Data

Mar. 20, 2000    (EP) ............................... 00480026.4

(51) Int. Cl.
*G06F 15/16* (2006.01)
(52) U.S. Cl. ..................... 709/232; 709/230; 709/238; 370/229
(58) Field of Classification Search ................ 709/230, 709/232, 238; 370/229
See application file for complete search history.

(56) References Cited

U.S. PATENT DOCUMENTS 5,924,116 A * 7/1999 Aggarwal et al. .......... 711/122

(Continued)

OTHER PUBLICATIONS

Miyasaka, Masahiro, "Traffic Control Method", Jul. 19, 2001, Nippon Telegr & Teleph Corp., 1 page.*

(Continued)

Primary Examiner—Kamini Shah
Assistant Examiner—Hai V. Nguyen
(74) Attorney, Agent, or Firm—Ronald A. D'Alessandro; Jerry W. Herndon

(57) ABSTRACT

The present invention relates to a system and method of dispatching an IP datagram comprising socks traffic on a socks server, in an Internet Protocol (IP) network comprising a plurality of socks servers, the IP datagram comprising an IP header comprising a Type Of Service (TOS) field. The method comprises in a socks dispatcher the steps of retrieving the value of the Type Of Service (TOS) field from the IP header of the IP datagram and selecting a socks server referring to a first table, said first table defining for each value of the TOS field one or a plurality of socks servers. The IP datagram is sent by an IP network device with a given priority. The step of retrieving the value of the Type Of Service (TOS) field is followed by the further step of determining the priority of the IP datagram by referring to a second table, the second table defining a priority for each value of the Type Of Service (TOS) field. The IP datagram comprising data according to a given application level protocol, the step of determining the priority of the IP datagram comprises the further step of determining the application level protocol of data transported in the IP datagram by referring to the second table, the second table defining a priority and an application level protocol for each value of the Type Of Service (TOS) field. In case of congestion in one or a plurality of output queues, the step of determining the priority of the IP datagram is followed by the further steps of discarding in the one or plurality of output queues IP datagrams having the lowest priority until there is no more congestion, and discarding the IP datagram when said IP datagram compared with IP datagrams in said one or plurality of output queues, has the lowest priority.

13 Claims, 9 Drawing Sheets

U.S. PATENT DOCUMENTS

| | | | | |
|---|---|---|---|---|
| 6,065,058 A * | 5/2000 | Hailpern et al. | ............ | 709/231 |
| 6,185,210 B1 * | 2/2001 | Troxel | ................. | 370/395.32 |
| 6,259,705 B1 * | 7/2001 | Takahashi et al. | .......... | 370/465 |
| 6,304,552 B1 * | 10/2001 | Chapman et al. | .......... | 370/232 |
| 6,385,644 B1 * | 5/2002 | Devine et al. | ............. | 709/206 |
| 6,449,647 B1 * | 9/2002 | Colby et al. | ................ | 709/226 |
| 6,647,424 B1 * | 11/2003 | Pearson et al. | ............. | 709/232 |
| 6,658,463 B1 * | 12/2003 | Dillon et al. | ............... | 709/219 |
| 6,704,768 B1 * | 3/2004 | Zombek et al. | ............ | 709/201 |
| 6,779,035 B1 * | 8/2004 | Gbadegesin | ................ | 709/228 |
| 6,823,393 B1 * | 11/2004 | Hericourt | ................... | 709/230 |
| 6,862,629 B1 * | 3/2005 | Hericourt | ................... | 709/238 |
| 2002/0093910 A1 * | 7/2002 | Yasaki et al. | .............. | 370/229 |

OTHER PUBLICATIONS

Fiuczynski et al., "The Design and Implementation of an IPv6/IPv4 Network Address and Protocol Translator", 1998, Dept. of Computer Science and Engineering, University of Washington, 11 pages.*

Ng et al., "Implementation of IPv6 ToS over ATM Newwork",School Of Engineering Science, Simon Fraser Univerity, Vancouve Canada, 7 pages.*

Kitamura, Hiroshi, "Entering the IPv6 Communiation World by SOCKS-based IPv6/IPv4 Translator", NED Corp., 15 pages.*

* cited by examiner

METHOD AND SYSTEM OF DISPATCHING SOCKS TRAFFIC USING TYPE OF SERVICE (TOS) FIELD OF IP DATAGRAMS

TECHNICAL FIELD OF THE INVENTION

The present invention relates to IP (Internet Protocol) networks comprising a plurality of Socks Servers, and more particularly to a method and system using the Type Of Service (TOS) field of IP datagrams, for optimally dispatching IP datagrams among a plurality of Socks Servers according some Priority and Application Level protocol criteria.

BACKGROUND ART

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

transmitting and receiving electronic mail,
logging into remote computers (the "Telnet"), and
transferring files and programs from one computer to another ("FTP" or "File Transfer Protocol").

The TCP/IP protocol suite is named for two of the most important protocols:

a Transmission Control Protocol (TCP), and
an Internet Protocol (IP).

Another name for it is the Internet Protocol Suite. The more common term TCP/IP is used to refer to the entire protocol suite. The first design goal of TCP/IP is to build an interconnection of networks that provide universal communication services: an internetwork, or internet. Each physical network has its own technology dependent communication interface, in the form of a programming interface that provides basic communication functions running between the physical network and the user applications. The architecture of the physical networks is hidden from the user. The second goal of TCP/IP is to interconnect different physical networks to form what appears to the user to be one large network.

TCP is a transport layer protocol providing end to end data transfer. It is responsible for providing a reliable exchange of information between 2 computer systems. Multiple applications can be supported simultaneously over one TCP connection between two computer systems.

IP is an internetwork layer protocol hiding the physical network architecture below it. Part of the communicating messages between computers is a routing function that ensures that messages will be correctly directed within the network to be delivered to their destination. IP provides this routing function. An IP message is called an IP Datagram.

Application Level protocols are used on top of TCP/IP to transfer user and application data from one origin computer system to one destination computer system. Such Application Level protocols are for instance File Transfer Protocol (FTP), Telnet, Gopher, Hyper Text Transfer Protocol (HTTP).

A router interconnects networks at the internetwork layer level (IP) and routes messages between them. Routers are able to select the best transmission path between networks. The basic routing function is implemented in the IP layer of the TCP/IP protocol stack, so any host (or computer) or workstation running TCP/IP over more than one interface could, in theory, forward the messages between networks. However, dedicated network hardware devices called "Routers" provide more sophisticated routing functions than the minimum functions implemented in IP. Because IP implements the basic routing functions, the term "IP Router" is often used.

With the increasing size and complexity of the Internet, tools have been developed to help find information on the network, often called navigators or navigation systems. Navigation systems that have been developed include standards such as Archie, Gopher and WAIS. The World Wide Web ("WWW" or "the Web") is a recent superior navigation system. The Web is:

an Internet-based navigation system,
an information distribution and management system for the Internet, and
a dynamic format for communicating on the Web.

The Web seamlessly, for this use, integrates format of information, including still images, text, audio and video. A user on the Web using a graphical user interface ("GUI", pronounced "gooey") may transparently communicate with different host computers on the system, and different system applications (including FTP and Telnet), and different information formats for files and documents including, for example, text, sound and graphics.

The Web uses hypertext and hypermedia. Hypertext is a subset of hypermedia and refers to computer-based "documents" in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet.

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server.

Each Web page that appears on client monitors of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. The Web uses a language or protocol to communicate with Web clients which is called Hyper Text Transfer Protocol ("HTTP"). All types of data can be exchanged among Web servers and clients using this protocol, including Hyper Text Markup Language ("HTML"), graphics, sound and video. HTML describes the layout, contents and hyperlinks of the documents and pages. Web clients when browsing:
  convert user specified commands into HTTP GET requests,
  connect to the appropriate Web server to get information, and
  wait for a response. The response from the server can be the requested document or an error message.

After the document or an error message is returned, the connection between the Web client and the Web server is closed.

The first version of HTTP is a stateless protocol. That is with HTTP, there is no continuous connection between each client and each server. The Web client using HTTP receives a response as HTML data or other data. This description applies to version 1.0 of HTTP protocol, while the new version 1.1 break this barrier of stateless protocol by keeping the connection between the server and client alive under certain conditions.

After receipt, the Web client formats and presents the data or activates an ancillary application such a sound player to present the data. To do this, the server or the client determines the various types of data received. The Web Client is also referred to as the Web Browser, since it in fact browses documents retrieved from the Web Server.

The host or computers names (like www.entreprise.com) are translated into numeric Internet addresses (like 194.56.78.3), and vice versa, by using a method called DNS ("Domain Name Service"). DNS is supported by network-resident servers, also known as domain name servers or DNS servers.

Some companies use the same mechanism as the Web to communicate inside their own corporation. In this case, this mechanism is called an "Intranet". These companies use the same networking/transport protocols and locally based Web servers to provide access to vast amounts of corporate information in a cohesive fashion. As this data may be private to the corporation, and because the members of the company still need to have access to public Web information, to avoid people not belonging to the company from accessing to this private Intranet coming from the public Internet, intranets may be protected by using special equipment called a Firewall.

A Firewall protects one or more computers with Internet connections from access by external computers connected to the Internet. A Firewall is a network configuration, usually created by hardware and software, that forms a boundary between networked computers within the Firewall from those outside the Firewall. The computers within the Firewall form a secure sub-network with internal access capabilities and shared resources not available from the outside computers.

Often, a single machine, on which the Firewall is, allows access to both internal and external computers. Since the computer, on which the Firewall is, directly interacts with the Internet, strict security measures against unwanted access from external computers are required.

A Firewall is commonly used to protect information such as electronic mail and data files within a physical building or organization site. A Firewall reduces the risk of intrusion by unauthorized people from the Internet, however, the same security measures can limit or require special software for those inside the Firewall who wish to access information on the outside. A Firewall can be configured using "Proxies" or "Socks" to designate access to information from each side of the Firewall.

An HTTP Proxy is a special server that typically runs in conjunction with Firewall software and allows access to the Internet from within a Firewall. The Proxy Server:
  waits for a request (for example a HTTP request) from inside the Firewall,
  forwards the request to the remote server outside the Firewall,
  reads the response, and
  sends the response back to the client.

A single computer can run multiple servers, each server connection identified with a port number. A Proxy Server, like an HTTP Server or a FTP Server, occupies a port. Typically, a connection uses standardized port numbers for each protocol (for example, HTTP=80 and FTP=21). That is why an end user has to select a specific port number for each defined Proxy Server. Web Browsers usually let the end user set the host name and port number of the Proxy Servers in a customizable panel. Protocols such as HTTP, FTP, Gopher, WAIS, and Security can usually have designated Proxies. Proxies are generally preferred over Socks for their ability to perform caching, high-level logging, and access control, because they provide a specific connection for each network service protocol.

Socks is a protocol which does some form of encapsulation of Application Level protocols (for instance FTP, Telnet, Gopher, HTTP). Using Socks, the Application Level traffic between a system running a Socks Client software and a system running a Socks Server software is encapsulated in a virtual Socks tunnel between both systems. Socks is mainly used by systems within an Intranet in order to gain a secure access to systems located outside the Intranet.

A Socks Server acts as a relay between the systems within the Intranet and the systems outside the Intranet, thus hiding the internal systems from the external Internet. It is considered as one form of Firewall.

A Socks Server (also called Socks Gateway) is software that allows computers inside a Firewall to gain access to the Internet. A Socks Server is usually installed on a server positioned either inside or on the Firewall. Computers within the Firewall access the Socks Server as Socks Clients to reach the Internet. Web Browsers usually let the end user set the host name and port number of the Socks Servers in a customizable panel. On some Operating Systems, the Socks Server is specified in a separate file (e.g. socks.conf file). As the Socks Server acts a layer underneath the protocols (HTTP, FTP, . . . ), it cannot cache data (as Proxy does), because it doesn't decode the protocol to know what kind of data it transfers.

When multiple Firewalls are used to gain access to systems outside the Intranet, a dedicated device called a "Dispatcher System" is often used within the Intranet for dispatching the traffic to these multiple Firewalls. The main goal of the Dispatcher System is to balance the load across the multiple Firewalls. For instance when a very powerful Firewall and a smaller Firewall are available, more traffic should be dispached on the very powerful Firewall than on the smaller one. Such Dispatcher Systems are either dedicated hardware devices, or software components installed on existing network device (such as an IP Router).

The problem is to provide an optimized system and method for dispatching Socks traffic within a TCP/IP network. By nature, the Socks protocol is a form of encapsulation of Application Level traffic such as HTTP, FTP, or Telnet. When Socks Servers are used within an Intranet to provide secure access to systems located outside this Intranet, IP routers and network devices within this Intranet only see and handle Socks traffic. As a consequence, all Application Level protocols encapsulated by Socks are treated alike within the TCP/IP network.

When multiple Socks Servers are used within the Intranet to access systems outside the Intranet, a dedicated device called "Dispatcher System" is often used for dispatching the traffic on these multiple Socks Servers. The purpose of such a Dispatcher System is mainly to balance the traffic load across the multiple Socks Servers. For instance when a very powerful Socks Server and a smaller Socks Servers are available, more traffic can be dispatched on the very powerful Socks Server than on the smaller one.

In a Socks environment, the problem is that a Dispatcher System only sees and processes Socks traffic and does not see the Application Level traffic which is encapsulated in said Socks traffic. As a consequence, all Application Level protocols such as HTTP, FTP, Telnet, are treated alike by the Dispatcher System. There is no differentiation between Application Level connections. For instance, an interactive Telnet traffic is processed with the same priority than a batch FTP traffic. The Telnet traffic should be dispatched to a very powerful Socks Server while the FTP traffic should be dispatched to a smaller Socks Server.

Current solutions address this problem partially:

The dispatching of Socks traffic can be done based on the IP address of the origin computer system or/and based on the IP address of the destination computer system. The main drawbacks are:

For a given origin or destination system, Socks traffic is always processed the same way. IP Routers and Dispatcher Systems always see the same Socks traffic without differentiating the Application Level protocols. For instance, an interactive Telnet connection and a batch FTP connection from the same origin will be handled with the same priority. Thus, the high priority interactive Telnet connection may be slowed down by the low priority batch connection.

All Socks Servers handle indifferently all Application Level protocols since a Socks Server cannot be selected by the Dispatcher System according to the Application Level protocol it supports. For instance, it is not possible to have a high capacity Socks Server handling all Application Level protocols and another low capacity Socks Server handling only FTP traffic because the Dispatcher System has not the knowledge of the Application Level protocol (HTTP, FTP, . . . ) encapsulated in the Socks traffic.

The dispatching of Socks traffic can be done based on some Application Level information directly retrieved from the data part of the IP Datagram. The main drawbacks are:

The Dispatcher System must parse the data part of the IP Datagrams it receives and must retrieve the Application Level information required to identify the Application Level protocol. Such complex parsing of IP Datagrams is a heavy process which has usually an impact on the performance of the Dispatcher and therefore has an impact on the service provided by the Dispatcher and the Socks Servers.

The Dispatcher System usually has to keep connection tables to save some parameters concerning connections. This requires large and costly memories within the Dispatcher System.

OBJECT OF THE INVENTION

An object of the present invention is to dispatch Socks traffic among a plurality of Socks Servers according to the value of the Type Of Service (TOS) field comprised in IP datagrams.

It is a further object of the present invention to use the Type Of Service (TOS) field of IP Datagrams for determining priority and application Level protocol.

It is a further object of the present invention to optimize the performance of WEB access via Socks Servers, by integrating priority and Application Level protocol factors in the Socks Server selection process.

It is another object of the present invention to minimize the interruption of WEB access via Socks Servers and to insure a better WEB access availability, by dropping low priority traffic in case of congestion.

SUMMARY OF THE INVENTION

The present invention relates to a system and method of dispatching an IP datagram comprising socks traffic on a socks server, in an IP network comprising a plurality of socks servers, the IP datagram comprising an IP header comprising a Type Of Service (TOS) field. The method comprises in a socks dispatcher the steps of:

retrieving the value of the Type Of Service (TOS) field from the IP header of the IP datagram.

selecting a socks server referring to a first table, said first table defining for each value of the TOS field one or a plurality of socks servers.

The IP datagram is sent by an IP network device with a given priority. The step of retrieving the value of the Type Of Service (TOS) field is followed by the further step of:

determining the priority of the IP datagram by referring to a second table, the second table defining a priority for each value of the Type Of Service (TOS) field.

The IP datagram comprising data according to a given application level protocol, the step of determining the priority of the IP datagram comprises the further step of:

determining the application level protocol of data transported in the IP datagram by referring to the second table, the second table defining a priority and an application level protocol for each value of the Type Of Service (TOS) field.

In case of congestion in one or a plurality of output queues, the step of determining the priority of the IP datagram is followed by the further steps of:

discarding in the one or plurality of output queues IP datagrams having the lowest priority until there is no more congestion, discarding the IP datagram when said IP datagram compared with IP datagrams in said one or plurality of output queues, has the lowest priority.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein

PREFERRED EMBODIMENT OF THE INVENTION

Figure 1:
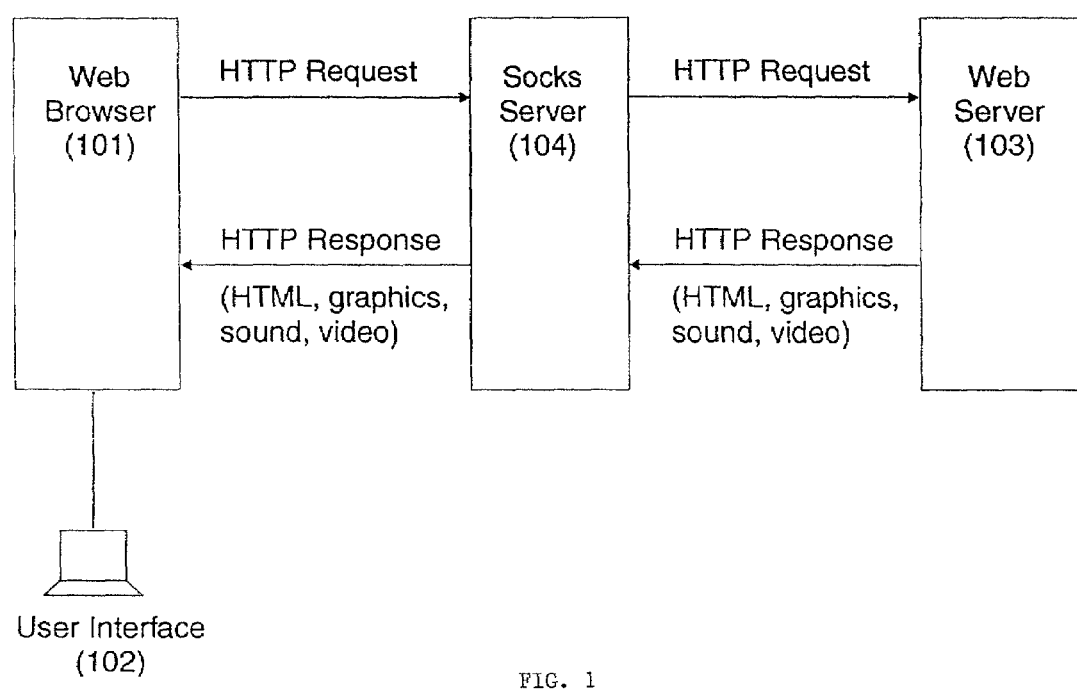
FIG. 1 is a logical view of an end user system accessing the World Wide Web, according to prior art.

FIG. 1 shows a user system with a user interface (102) comprising a Web Browser (101) for accessing the World-Wide-Web (WWW). The WWW content is transferred using the HTTP protocol. HTTP requests and responses are exchanged between the Web Browser program (101) and a destination Web Server (103) containing the WWW information the user wants to access. The Socks Server (104) between the Web Browser (101) and the Web Server (103) acts as an intermediary HTTP Relay forwarding the HTTP requests and responses to their destination. The Web Browser program (101) makes an HTTP request to the Socks Server (104) and the Socks Server forwards the request to the destination Web Server (103). The flow in the reverse direction (HTTP response) again goes via the Socks Server (104) to the Web Browser (101). In this way the Socks Server can limit the traffic to authorised transactions according to its configuration (based on some defined security and access control policy). The Socks Server hence protects the network where Web Browser is located.

Figure 2:
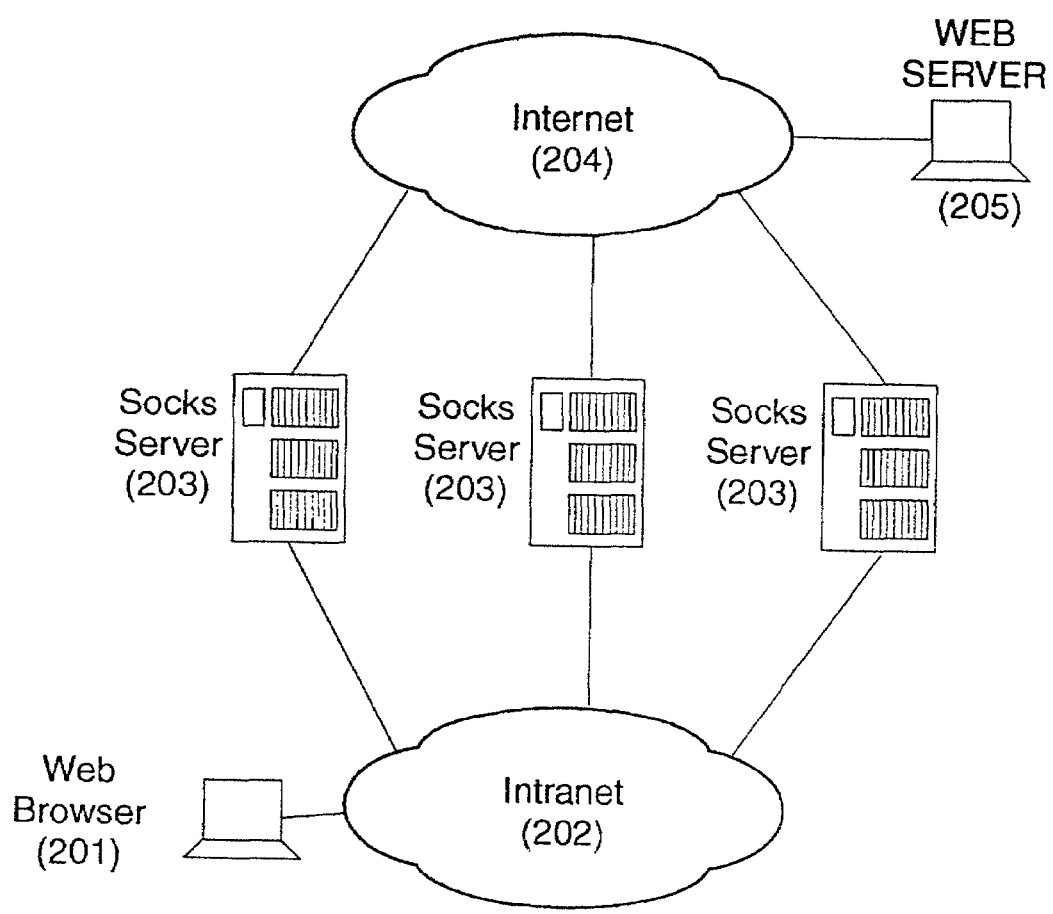
FIG. 2 is a general view of an end user system accessing the World Wide Web according to prior art.

FIG. 2 is a physical view of the set-up logically described in FIG. 1. In this particular example, the Web Browser (201) runs on a system (workstation) connected to an Intranet (202) network. The Socks Servers (203) protecting the Intranet connect both the (private) Intranet (202) and the (public) Internet (204). the destination Web Server (205) is also connected to the Internet. It is important to note that Socks Servers attach two networks and hence act as intermediaries for communications between said two networks. Multiple Socks Servers are often used in order to provide access robustness and load sharing.

Figure 3:
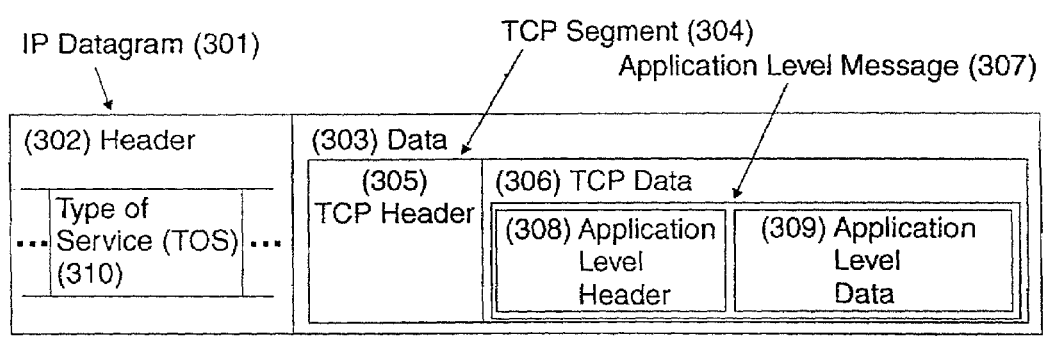
FIG. 3 shows an IP Datagram according to prior art.

The transfer unit of a data packet in TCP/IP is called an IP Datagram. It is made up of a header containing information for IP protocol and data that is only relevant to the higher level protocol. FIG. 3 shows the format of a IP Datagram, in the environment described in FIGS. 1 and 2:

(301) IP Datagram. an IP Datagram is a message exchanged between 2 computer systems across a TCP/IP network. An IP Datagram is divided in 2 parts:
a Header, and
Data.
(302) IP Datagram Header. the header comprises fields such as:
the Type Of Service (TOS) field (310),
the Source IP Address (the IP address of the computer which sends the IP Datagram),
the Destination IP Address (the IP address of the computer which is the destination of the IP Datagram).

The IP Header is mainly used to route the IP Datagram to its final destination. The Type Of Service (TOS) field (310) is an indication of the quality of service requested for the IP Datagram. It can be used to provide the nature and the priority of the IP Datagram. It can be set either by the system initiating the connection (the origin), or on the fly by a network device within the network.

(303) IP Datagram Data. This field comprises the data sent by the originator to the destination computer system. The destination computer system processes this data. Since the TCP/IP protocol suite is organised in layers, the IP Datagram field comprises the message relevant to the higher level protocol (which is TCP in the environment related to the invention).

(304) TCP Segment. A TCP message is usually called TCP Segment.

(305) TCP Header. A TCP Header comprises fields such as the Source Port and the Destination Port which identify the application protocol (e.g. HTTP, FTP, Telnet, Socks) transported by TCP. This field is mainly used by the destination of the IP Datagram to determine which application must process the data transported by TCP.

(306) TCP Data. The TCP Data field comprises application data which are sent by the originator to the destination computer system. The destination computer system processes the data. Since the TCP/IP protocol suite is organised in layers, the TCP Data part contains the information relevant to the higher level protocol which is the Application level protocol (such as HTTP, FTP, Telnet, Socks).

(307) Application Level Message. The TCP Data part of the IP Datagram contains an Application Level Message. This is for example a Socks message (for instance a "CONNECT" or a "BIND" message), a HTTP message, a FTP message, or a Telnet message. Depending on the Application level protocol, this Application Level Message can also be split in 2 parts.

(308) Application Level Header. The Application Level Header is the header relevant to the application protocol such as HTTP, FTP, Telnet.

(309) Application Level Data. This is the data part which is processed by the application responsible for handling the Application Level protocol. This is usually the data which is directly relevant to the end user (for instance, data entered by an end user on his workstation).

Figure 4:
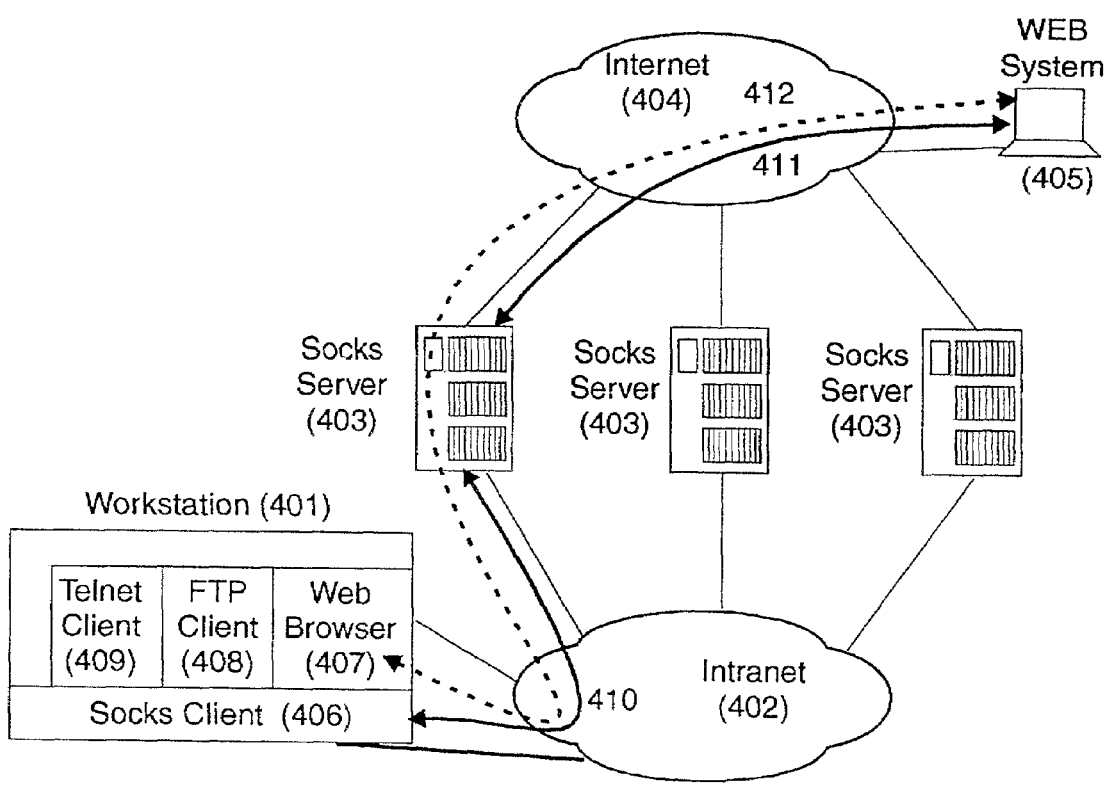
FIG. 4 is a general view of an end user system accessing the World Wide Web through Socks Servers according to prior art.

A Socks is a networking proxy protocol that allows client workstations to gain full access to hosts outside their local network (Intranet) while providing a high degree of security. FIG. 4 shows an end user workstation (401) connected to an Intranet (402). The Socks Servers (403) that protect the Intranet attach both the (private) Intranet (402) and the (public) Internet (404). The destination Web System (405) also connects the Internet (the Web System is for instance a WEB Browser, a FTP Server, or any system attached to the Internet that can be accessed from the Intranet).

The end user workstation (401) comprises a software program called Socks Client (406) for a secure access to the World-Wide-Web (WWW) via a Socks Server. The Socks protocol is independent of the Application Level protocol, and can therefore be used for instance for HTTP, FTP, or Telnet communications.

WEB Applications running on the end user workstation (such as a WEB Browser (407), an FTP Client (408), or a Telnet Client (409)) use the services of a Socks Client (406) to gain access to an outside WEB System (405). The Socks Client located on the end user workstation sends (410) IP Datagrams to a Socks Server. The Socks Client creates some form of "virtual tunnel" between the workstation and the Socks Server. The Socks Server authenticates the user, authorizes the request, establishes a connection (411) with the outside WEB System, and then transparently forward application data between the end user workstation and the WEB System (412).

Figure 5:
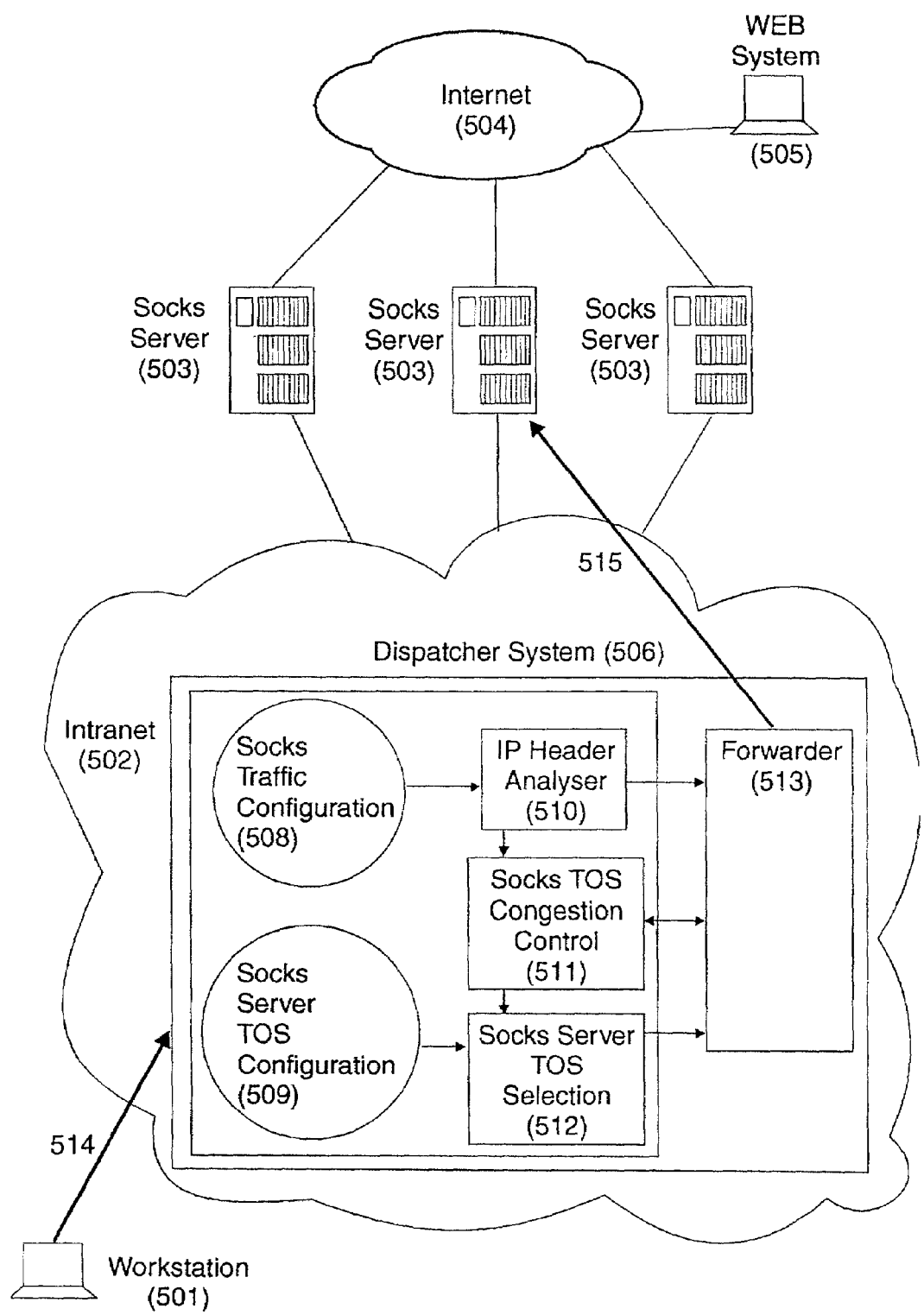
FIG. 5 shows a system for dispatching Socks traffic according to the present invention.

The present invention relates to a system and method for selecting the "best" Socks Server among a plurality of Socks Servers according to priority and Application Level protocol criteria to insure availability and response time to end users accessing the World Wide Web from their workstations. FIG. 5 is a view of a system for dispatching Socks traffic on Socks Servers (503) according to the present invention. An end user workstation (501) comprising a Socks Client is connected to the Intranet (502). Multiple Socks Servers (503) are available to gain access to the WEB System (505) connected to the Internet (504). The Dispatcher System (506) is located within the Intranet.

The present method and system uses the Type Of Service (TOS) field within the IP Datagram for dispatching the Socks traffic. In the present description, the function in charge of the dispatching of the Socks traffic within the Dispatcher System will be called "Socks TOS Dispatcher" (507).

The Socks TOS Dispatcher (507) within the Dispatcher System (506) is configured with information concerning the Socks traffic (508) and with information concerning Socks Servers (509). When the Dispatcher System receives an IP Datagram (514) from an end user workstation (501), it forwards this IP Datagram to the Socks TOS Dispatcher. The IP Datagram is then forwarded in sequence to a plurality of other components to perform the dispatching of the Socks traffic:

(510) an IP Header Analyser component analyses the IP Header of the IP Datagram and determines the priority and the Application Level protocol of said IP Datagram. This component uses the TOS field of the IP Datagram header jointly with a table comprising information concerning the Socks traffic (Socks traffic Configuration table (601)).

(511) a Socks TOS Congestion Control component detects any congestion on the Dispatcher System, and, if required, discards traffic according to priority and Application Level criteria deducted from the TOS field.

(512) a Socks Server TOS Selection component selects the best Socks Server among the plurality of Socks Servers to forward the IP Datagram. The selection is based on the characteristics (capacity, supported Application Level protocol) of the different Socks Servers and on some elements describing the Socks traffic (priority, Application Level protocol).

The Socks TOS Dispatcher ultimately forward the IP Datagram to a Forwarder (513) component within the Dispatcher System. This Forwarder component forwards (515) the IP Datagram to the selected Socks Server. Current products offer an IP Forwarder or a Dispatcher component, such as the IP Routing component implemented in any IP Router or such as the TCP Dispatcher component implemented in existing Dispatcher Systems. The invention is independent of the Forwarder component and does not rely on the way the IP Datagram is handled by this Forwarder component which can then for instance use forwarding mechanisms either based on the IP address or on the MAC (Medium Access Control) address of the Socks Server.

Figure 6:
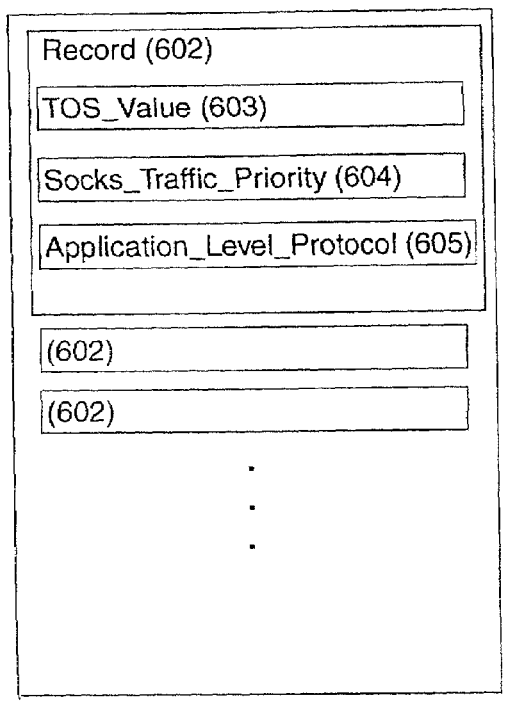
FIG. 6 shows the configuration of a Socks Dispatcher System according to the present invention.
Figure 6:
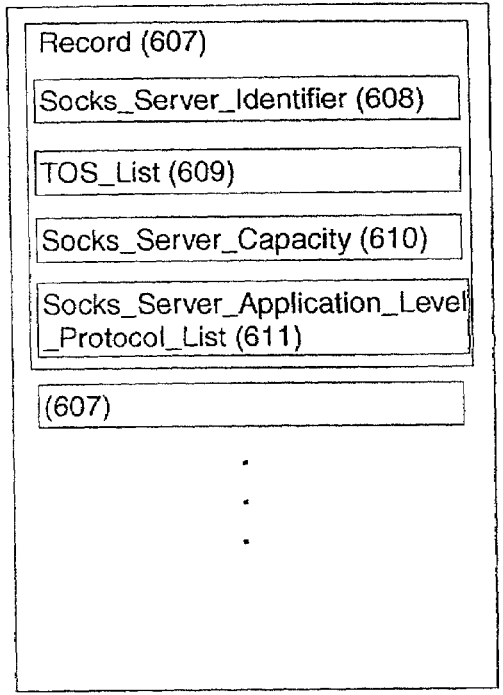

FIG. 6 depicts the different configuration tables located on the Dispatcher System. These tables are used by the various components of the Socks TOS Dispatcher for the IP Header analysis, the congestion control, and the Socks Server selection. Two configuration tables are used by the Socks TOS Dispatcher on the Dispatcher System:

- A Socks Traffic Configuration table. This table defines specific TOS (Type of Service) values for the different traffic priorities and Application Level protocols.
- A Socks Server TOS Configuration table. This table comprises for each Socks Server, one or a plurality of TOS values, and the characteristics of said Socks Server (capacity, supported Application Level Protocol(s)).

These two configuration tables are detailed in FIG. 6:

(601) Socks Traffic Configuration table.

This table (a flat file in a preferred embodiment) is created by the Network Administrator in charge of the Intranet. The Network Administrator associates the possible values of the Type Of Service (TOS) field with traffic priorities and Application Level protocols. The table contains a list of records (602), each record (TOS value) comprising the following information:

(603) Type Of Service (TOS) field value. This field comprises one value (TOS_Value) among all possible values that can take the TOS field. The possible values that can take the TOS field are
either dictated by the Network Administrator according to the specifications of the network devices used within the Intranet (for instance the values of the TOS field may have to comply with some industry de facto standards already in use within the Intranet),
or arbitrarily selected by the Network Administrator according to a private corporate policy.

In both cases, the possible values of the TOS field entered in the Socks Traffic Configuration table must be coherent with the values of the TOS field which are used either by the origin workstation (the system which creates the IP Datagram, including the TOS field) or by the network devices within the Intranet which can alter the TOS field of the IP Datagrams they process (for instance an IP Router can alter the TOS field of the IP Datagram it routes). In the present invention, the Dispatcher System assumes the TOS field has been correctly set in the IP Datagram it receives, and does not alter it.

(604) Socks_Traffic_Priority (also referred to as STP). This field comprises the priority of the Socks traffic. This priority is associated with the value of the TOS field (603). For instance, a TOS value of 0 will be associated with the minimum priority, while a TOS value of 8 will be associated with a maximum priority. The priority is a mandatory indication in the Socks Traffic Configuration record.

(605) Application_Level_Protocol (also referred to as ALP). This field comprises the Application Level protocol of the Socks traffic. This is not a mandatory indication in the Socks Traffic Configuration record, because it may happen that not enough TOS values are available for each Application Level protocol. When no Application Level protocol is explicitly defined, a default value "unknown" is used. Typically, the Application_Level_Protocol is explicitly indicated for most common WEB protocols such as Gopher, FTP, Telnet, HTTP, SSL (this is Secure HTTP). For instance, a TOS value of 0 will be associated with Gopher protocol, a TOS value of 1 will be associated with FTP, a TOS value of 2 will be associated with Telnet, a TOS value of 3 will be associated with HTTP, a TOS value of 4 will be associated with SSL.

The Socks Traffic Configuration table also contains one default record with default values for Socks_Traffic_Priority and Application_Level_Protocol. These default values are relevant to all IP Datagrams which TOS value is not explicitly defined in the table.

(606) Socks Server TOS Configuration table.

This table (a flat file in a preferred embodiement) is created by the Network Administrator in charge of the Intranet. The table comprises for each Socks Server one or a plurality of TOS values, and the characteristics of said Socks Server (capacity, supported Application Level Protocol(s)). The TOS values correspond to the Socks traffic that can be dispatched to the Socks Server. The table comprises a list of records (607), each record (Socks Server) providing the following information:

(608) Socks_Server_Identifier. This field comprises the address of the Socks Server. This is for instance the IP Address or the MAC (Medium Access Control) address of the Socks Server.

(609) Type Of Service List (also referred to as TOS_List). This list comprises the TOS values (one or a plurality of TOS values) associated with the Socks Server. This means that the Socks Server is capable of handling any Socks traffic with a TOS value comprised in this list. Again, the possible values of the TOS field are either dictated by the Network Administrator according to the specifications of the network devices used within the Intranet (for instance the values of the TOS field may have to comply with some industry de facto standards already in use within the Intranet), or arbitrarely selected by the Network Administrator according to a private corporate policy.

In both cases, the possible values of the TOS field entered in the Socks Server TOS Configuration table must be coherent with the values of the TOS field which are used either by the originator workstation (the system which creates the IP Datagram, including the TOS field) or by the network devices within the Intranet which can alter the TOS field of the IP Datagrams they process (for instance an IP Router which can alter the TOS field of the IP Datagram it routes). The Dispatcher System assumes the TOS field has been correctly set in the IP Datagram it receives, and does not alter it.

(610) Socks_Server_Capacity. This is the capacity of the Socks Server. Typically, a very powerful Socks Server corresponds to a high capacity. For instance a Socks Server with a Capacity of 15 will receive more Socks traffic than a Sock Server with a Capacity of 0. High priority Socks traffic will preferably be dispatched on a Socks Server with a high capacity.

(611) Socks_Server Application_Level_Protocol_List (also referred to as Socks_Server_ALP_List). This is a list of one or multiple Application Level protocols handled by the Socks Server. For instance, a Socks Server with a low capacity can be configured to only process FTP, while a more powerful Socks Server can be configured to process all Application Level protocols. A default value "ALL" indicates that the Socks Server is capable of handling any Application Level protocol.

Figure 7:
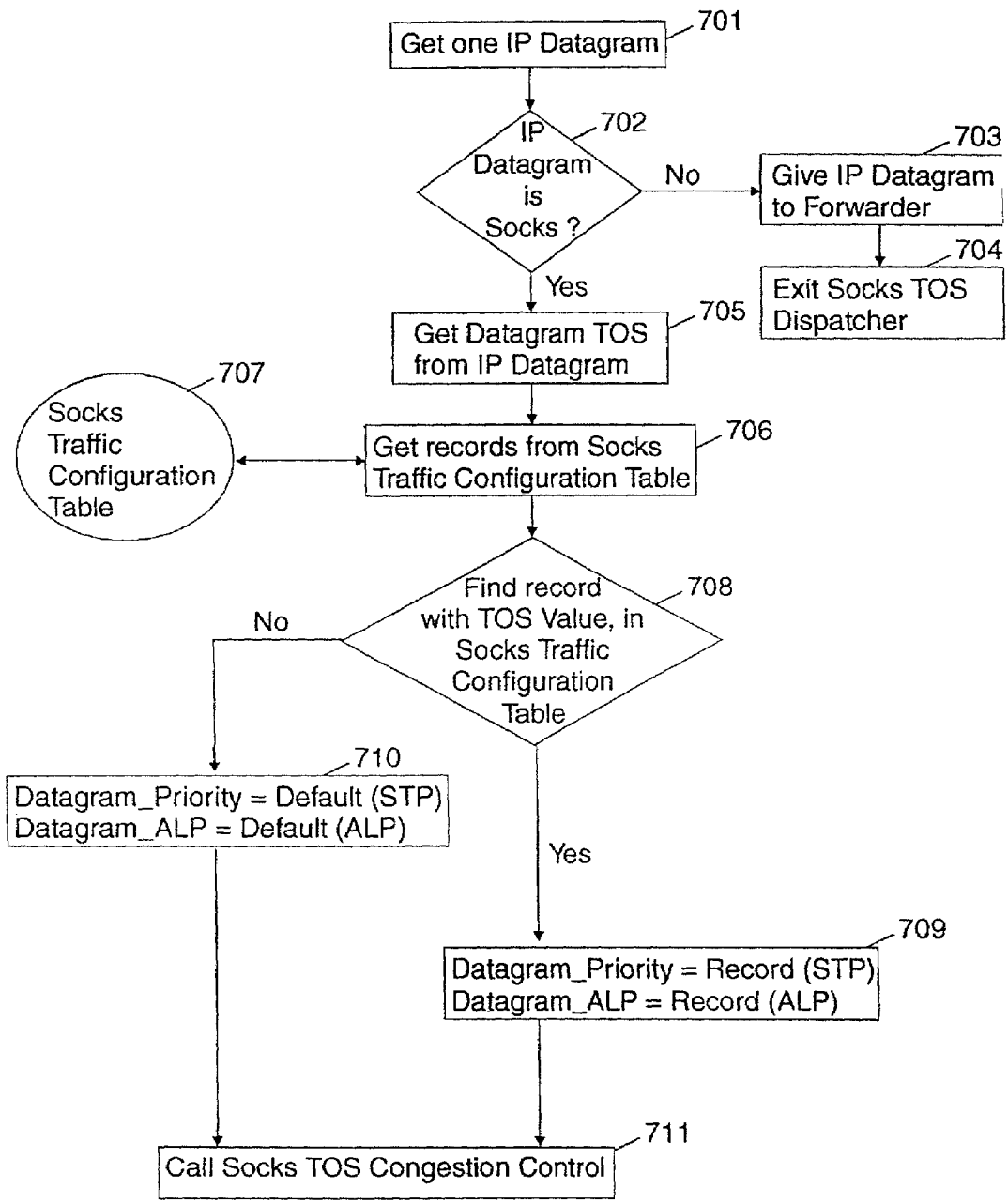
FIG. 7 is a flow chart of the process for analysing an IP Datagram Header in a Socks Dispatcher System according to the present invention.

The IP Header Analyser component of the Socks TOS Dispatcher is a computer program running on the Dispatcher System. This component is in charge of determining the IP Datagram priority and the Application Level protocol. The IP Header Analyser uses the IP Datagram TOS field and the Socks Traffic Configuration table (601). FIG. 7 is a flow chart which refers to the internal logic of the IP Header Analyser component. This component:

(701) gets the IP Datagram received by the Dispatcher System.

(702) tests if this IP Datagram transports Socks traffic or not. The test preferably uses the Destination Port field in the TCP Header comprised in the Data part of the IP Datagram. The Destination Port field is compared to the Port using the Socks protocol (by default, the Port used by Socks is 1080). The Port used by the Socks protocol can, for instance, be a configuration parameter of the Socks TOS Dispatcher. If the Destination Port in the TCP Header is equal to the Port used by Socks, then the IP Datagram transports Socks traffic, otherwise the IP Datagram does not transport Socks traffic and does not need to be processed by the Socks TOS Dispatcher.

If the IP Datagram does not transport Socks traffic:
(703) the IP Datagram is directly forwarded to the Forwarder component of the Dispatcher System because the Socks TOS Dispatcher is not involved in the dispatching of non Socks traffic.
(704) The processing by the Socks TOS Dispatcher of the IP Datagram is completed. The Socks TOS Dispatcher waits for the next IP Datagram.

If the IP Datagram transports Socks traffic:
(705) the value of the TOS field is retrieved from the IP Header of the IP Datagram. This value is called Datagram_TOS.
(706) all records are retrieved from the Socks Traffic Configuration table (707). This list of records is preferably read only once for all and cached (locally stored) by the IP Header Analyser at initialization time, in order to minimize any impact on performances.
(708) the list is scanned to find a record with a TOS_Value corresponding to the Datagram_TOS (value of the TOS field extracted from the IP Datagram).

If such a record is found in the list:
(709) the Priority and the Application Level Protocol for this IP Datagram are deducted from this particular record:
Datagram_Priority=STP (Socks_Traffic_Priority) from the record
Datagram_ALP=ALP (Application_Level_Protocol) from the record.
(711) the Socks TOS Congestion Control program, which is the next component of the Socks TOS Dispatcher, is called.

If such a record is not found in the list:
(710) the Priority and the Application Level Protocol for this Datagram are extracted from the Default record:
Datagram_Priority=STP (Socks_Traffic_Priority) from the Default record (for instance medium priority).

Datagram_ALP=ALP (Application_Level_Protocol) from the Default record (for instance 'unknown').

(711) the Socks TOS Congestion Control program, which is the next component of the Socks TOS Dispatcher, is called.

The Socks TOS Congestion Control component of the Socks TOS Dispatcher is a program running on the Dispatcher System. When the Dispatcher System is congested, this component determines the list of IP Datagrams that are not yet sent and which must be discarded, according to multiple criteria:

The IP Datagram TOS,

The Priority of the IP Datagram, as determined by the IP Header Analyser component.

Optionally, the Application Level Protocol of the IP Datagram, as determined by the IP Header Analyser component.

Figure 8:
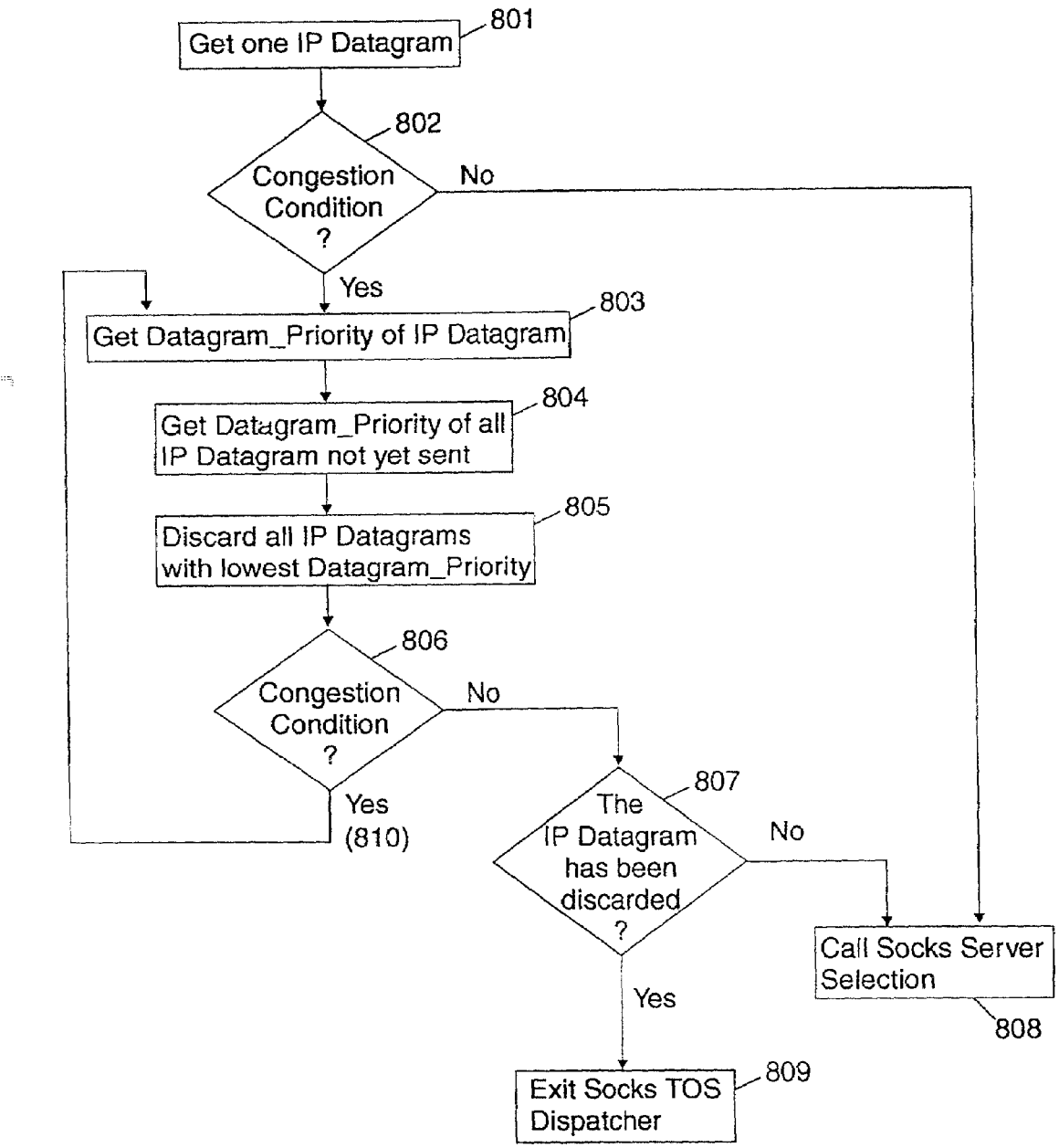
FIG. 8 is a flow chart of the process for controlling Socks congestion in a Socks Dispatcher System according to the present invention.

FIG. 8 is a flow chart which refers to the internal logic of the Socks TOS Congestion Control component. This component:

- (801) retrieves an IP Datagram forwarded by the IP Header Analyser component (along with its Datagram_TOS, Datagram_Priority, Datagram_ALP which have been determined by the IP Header Analyser component).
- (802) determines if there is a situation of congestion on the Dispatcher System. This can be done for instance by interfacing the Forwarder component and by checking if the output queues are full.

If there is a no congestion:

(808) calls the Socks Server TOS Selection component.

If there is a congestion:

- (803) gets the Datagram_Priority of the IP Datagram forwarded by the IP Header Analyser component and received by the Socks TOS Congestion Control.
  - (804) gets the Datagram_Priority of all IP Datagrams which have not yet been sent. For instance, such IP Datagrams can be found by interfacing the Forwarder component and by checking the output queues.

The Datagram_Priority of each of these IP Datagrams is preferably stored by the Forwarder along with the IP Datagram, and can be directly retrieved.

If the Datagram_Priority of each of these IP Datagrams has not been stored, it can be determined using the Socks Traffic Configuration table as already done in the IP Header Analyser component.
- (805) discards IP Datagrams with the lowest Datagram_Priority. This way, only IP Datagrams with the lowest priority are discarded, and IP Datagrams with the highest priorities can be sent. For instance, batch FTP traffic can be defined in the Socks Traffic Configuration table with a low priority while interactive Telnet traffic can be defined with a higher priority. This way, in case of congestion, the FTP traffic will be discarded prior to the Telnet traffic. Optionally, the Datagram_ALP can also be used in steps (803) and (804) of the IP Datagram discard process (805).
- (806) checks if there is still a congestion condition as in the step (802):

If there is no longer a situation of congestion:

- (807) Checks if the IP Datagram received by the Socks TOS Congestion Control has been discarded or not:
    - (808) if the received IP Datagram has not been discarded, forwards the IP Datagram to the Socks Server TOS Selection component.
        - (809) if the received IP Datagram has been discarded, exits the Socks TOS Dispatcher.

If there is still a situation of congestion:

- (810) gets back to (803). This loop is executed until the congestion condition has disappeared.

The Socks Server TOS Selection component is located within the Socks TOS Dispatcher. This component selects the Socks Server where the IP Datagram must be forwarded, according to multiple criteria:

The IP Datagram TOS,

The Priority of the IP Datagram, as determined by the IP Header Analyser component, The Application Level Protocol of the IP Datagram, as determined by the IP Header Analyser component, Some Socks Server characteristics:

The Socks Server Capacity,

The List of Application Level Protocols that can handle the Socks Server.

The criteria used by the Socks Server TOS Selection component are fully compatible and can co-exist with other existing criteria such as Socks Server dynamic load. Such other selection criteria can be added to the criteria used by the present invention.

Figure 9:
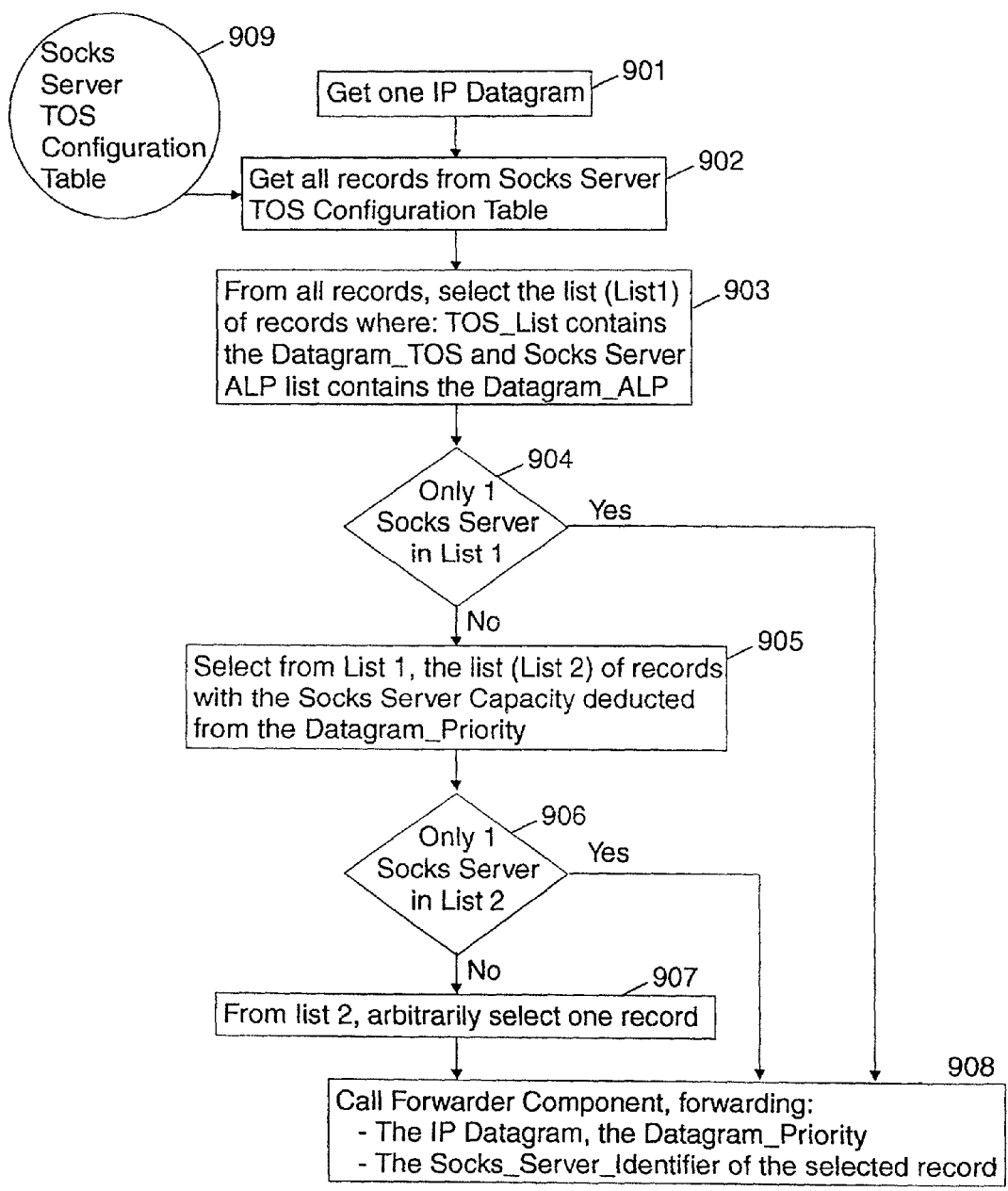
FIG. 9 is a flow chart of the process for selecting a Socks Server in a Socks Dispatcher System according to the present invention.

FIG. 9 is a flow chart which refers to the internal logic of the Socks Server TOS Selection component. This component:

- (901) gets the IP Datagram forwarded by the Socks TOS Congestion Control component.
- (902) retrieves all records from the Socks Server TOS Configuration table (909). The table is preferably read only once for all and cached by the Socks Server TOS Selection program at initialization time, in order to minimize any impact on performances.
- (903) scans all records from the Socks Server TOS Configuration table to find the list of all Socks Servers capable of handling the IP Datagram (and which are then candidate for the Socks Server selection). This corresponds to the list of records (called List1) which satisfy the 2 conditions (both conditions must be satisfied):
    The record TOS_List contains the Datagram_TOS (value of the TOS field in the received IP Datagram, as determined by the IP Header Analyser component)
    The record Socks_Server_ALP_List contains the Datagram_ALP (Application Level Protocol of the received IP Datagram, as determined by the IP Header Analyser component using the Datagram_TOS and the Socks Traffic Configuration table).
- (904) checks the number of records in List1.

If no record is found, this means that no Socks Server has been defined for that traffic, and therefore the IP Datagram is discarded and the Socks TOS Dispatcher exits.

Otherwise:

If List1 contains one record, the Socks Server defined for this record is selected. The Socks Server Identifier is extracted from this record.

- (908) the IP Datagram is forwarded to the Forwarder component with the Datagram_Priority and with the Socks_Server_Identifier. The Forwarder will then send the IP Datagram to the selected Socks Server. The Socks TOS Dispatcher waits for the next IP Datagram.

If List1 comprises more than one record, this means that more than one Socks Server can process the IP Datagram. Additional selection criteria must then be used:

(905) extracts from List1 all records (Socks Servers) with a specific capacity (610). This specific capacity is determined using the Datagram_Priority (Priority of the IP Datagram as determined by the IP Header Analyser component). This list of records is now called List2. The relationship between capacity and priority can be defined for instance in a table accessed by the Socks Server TOS Selection component. For instance, an IP Datagram with a high Datagram_Priority will be forwarded to a high capacity Socks Server to provide this traffic with the best quality of service.

(906) The number of records in List2 is checked:

If List2 comprises only one record, the Socks Server defined for this record is selected. The Socks Server Identifier is extracted from this record.

(908) the IP Datagram is forwarded to the Forwarder component, along with its Datagram_Priority and with the Socks Server Identifier. The Forwarder will then send the IP Datagram to the selected Socks Server. The Socks TOS Dispatcher waits for the next IP Datagram.

If List2 comprises more than one record, this means that more than one Socks Server can process the IP Datagram. Final selection criterias must then be applied:

(907) one of the records is arbitrarely selected in List2, or is preferably selected using any simple round robin algorythm (one record is selected this time, and next time another different one will be selected). The Socks Server defined for this record is selected. The Socks Server Identifier is extracted from this record.

(908) the IP Datagram is forwarded to the Forwarder component, along with its Datagram_Priority and with the Socks Server Identifier. The Forwarder sends the IP Datagram to the selected Socks Server. The Socks TOS Dispatcher then waits for the next IP Datagram.

The present inventions provides the following advantages:

The integration of a priority criteria for dispatching Socks traffic optimizes the Web service performances. For instance, a high priority Socks traffic (for instance HTTP traffic) can be dispatched to a Socks Server having a high capacity while a low priority Socks traffic can be dispatched to a Socks Server having a low capacity.

The integration of an Application Level protocol criteria for dispatching Socks traffic allows the use of differently configured Socks Servers (for capacity reason). For instance, a Socks Server with a high capacity can be configured to process all types of Application Level protocols, while a Socks Server with a poor capacity can be configured to process only FTP. Socks traffic can then be dispatched to either one or another Socks Server according to the Application Level protocol.

The integration of an Application Level protocol criteria for dispatching Socks traffic optimizes the Web service performances. For instance, Socks traffic comprising HTTP traffic can be dispatched to a high capacity Socks Server while Socks traffic comprising batch FTP traffic can be dispatched to a low capacity Socks Server.

The use the Type Of Service (TOS) field of the IP Datagram Header as input for the dispatching mechanism minimizes the process which takes place in the Socks Server selection. The impact on the performance of the Dispatcher System is minimized.

The integration of a priority criteria for discarding Socks traffic in case of congestion, contributes to the Web service availability. A low priority Socks traffic can be discarded by a congested Dispatcher System. The high priority Socks traffic can then be normally dispatched instead of being arbitrarely discarded. This ensures a service continuity to this high priority traffic.

The integration of an Application Level protocol criteria for discarding Socks traffic in case of congestion contributes to the Web service availability. For instance, a Socks traffic comprising batch FTP traffic can be discarded by a congested Dispatcher System. Interactive Socks traffic such as Telnet can then be normally dispatched instead of being arbitrarely discarded. This ensures a service continuity to this Telnet traffic.

The Dispatcher System assumes that the Type Of Service (TOS) field is set each time it receives an IP Datagram. The IP Datagram is only read and is not altered by the Dispatcher System. This process generates a minimum overload in the Socks traffic dispatching and has no impact on other network devices which may also use the TOS field.

While the invention has been particularly shown and described with reference to a preferred embodiment, it will be understood that various changes in form and detail may be made therein without departing from the spirit, and scope of the invention.

What is claimed is:

1. A method of dispatching an IP datagram comprising socks traffic on a socks server, in an Internet Protocol (IP) network comprising a plurality of socks servers said method comprising the steps of: in a socks dispatcher;

retrieving a value of a Type Of Service (TOS) field from the IP header of the IP datagram;

determining one or a plurality of socks servers defined for the value of the Type of Service (TOS) field retrieved from the IP datagram, one or a plurality of Type of Service (TOS) values being defined for each socks server;

determining an application level protocol of data transported in the IP datagram, the application level protocol being defined for each value of the Type of Service (TOS) field; and if more than one socks server is defined for the value of the Type of Service (TOS) field retrieved from the IP datagram, forwarding the IP datagram to a socks server selected according to one or a plurality of selection parameters, one selection parameter being the application level protocol previously determined.

2. The method according to claim 1 comprising the further step of:

determining a priority of the IP datagram, the priority being defined for each value of the Type of Service field.

3. The method according to claim 2 wherein one selection parameter is the priority previously determined.

4. The method according to claim 1 or 2 comprising the further step of:

determining a capacity of the one or a plurality of socks servers defined for the value of the Type of Service (TOS) field retrieved from the IP datagram, a socks server capacity being defined for each socks server.

5. The method according to claim 4, wherein one selection parameter is capacity of the one or a plurality of socks servers.

6. The method according to claim 5 wherein in case of congestion in one or a plurality of output queues, the step of determining the priority of the IP datagram is followed by the further steps of:
- discard in the one or a plurality of output queues IP datagrams having a lowest priority until there is no more congestion;
- discarding the IP datagram when the IP datagram compared with IP datagrams in the one or a plurality of output queues, has the lowest priority.

7. The method according to claim 1 or 2 wherein a first table, said first table comprises for each sock server:
- an identifier, preferably an address;
- one or a plurality of TOS field values;
- optionally, a sock server capacity; and
- optionally, application level protocols supported by the socks server.

8. The method according to claim 7 wherein a second table comprises for each value of the Type of Service field:
- a priority; and
- optionally, an application level protocol.

9. The method according to claim 8 comprising the initial steps of:
- configuring the first and second tables;
- defining a default socks server for values of the Type of Service field not defined in the first table; and
- defining a default priority and optionally a default application level protocol for values of the Type of Service (TOS) field not defined in the second table.

10. A socks dispatcher comprising:
- an IP intranet network comprising a plurality of socks servers; and
- an IP datagram comprising an IP header, said IP header comprising a Type Of Service (TOS) field wherein said socks dispatcher
- retrieves a value of said TOS field from the IP header of the IP datagram;
- determines one or a plurality of socks servers defined for the value of the Type Of Service (TOS) field retrieved from the IP datagram, one or a plurality of Type Of Service (TOS) values being defined for each socks server;
- determines an application level protocol of data transported in the IP datagram, the application level protocol being defined for each value of the Type OF Service (TOS) field; and
- if more than one socks server is defined for the value of the Type Of Service (TOS) field retrieved from the IP datagram, forwarding the IP datagram to a socks server selected according to one or a plurality of selection parameters, one selection parameter being the application level protocol previously determined.

11. A dispatcher according to claim 10 further comprising an IP network device wherein said IP datagram is sent by said IP network device with a given priority, and wherein said retrieving step is followed by a step of:
- determining the priority of the IP datagram by referring to a second table, said second table defining a priority for each value of the Type Of Service (TOS) field.

12. A computer program product on a computer readable medium having computer readable program code for dispatching an IP datagram comprising socks traffic on a socks server, in an Internet Protocol (IP) intranet network comprising a plurality of socks servers, said IP datagram comprising an IP header comprising a Type Of Service (TOS) field, said computer readable program code comprising the steps of: in a socks dispatcher:
- computer readable program code means for retrieving a value of said Type Of Service (TOS) field from the IP header of the IP datagram;
- computer readable program code means for determining one or a plurality of socks servers defined for the value of the Type Of Service (TOS) field retrieved from the IP datagram, one or a plurality of Type Of Service (TOS) values being defined for each socks server;
- computer readable program code means for determining an application level protocol of data transported in the IP datagram, the application level protocol being defined for each value of the Type OF Service (TOS) field; and
- if more than one socks server is defined for the value of the Type Of Service (TOS) field retrieved from the IP datagram, forwarding the IP datagram to a socks server selected according to one or a plurality of selection parameters, one selection parameter being the application level protocol previously determined.

13. The computer program product according to claim 12 wherein said IP datagram is sent by an IP network device with a given priority, and wherein said step of retrieving the value of the Type Of Service (TOS) field is followed by the further step of:
- in the socks dispatcher:
- computer readable program code means for determining the priority of the IP datagram by referring to a second table, said second table defining a priority for each value of the Type Of Service (TOS) field.

* * * * *